US012692351B2

(12) United States Patent
Nicoletti

(10) Patent No.: US 12,692,351 B2
(45) Date of Patent: Jul. 28, 2026

(54) PROCESS FOR THE TREATMENT OF THE PHOTOPOLYMER MATERIAL THAT CONSTITUTES THE MATRIX PLATES IN FLEXOGRAPHIC PRINTING

(71) Applicant: Ira Nicoletti, Mira (IT)

(72) Inventor: Ira Nicoletti, Mira (IT)

( * ) Notice: Subject to any disclaimer, the term of this patent is extended or adjusted under 35 U.S.C. 154(b) by 543 days.

(21) Appl. No.: 18/223,162

(22) Filed: Jul. 18, 2023

(65) Prior Publication Data

US 2024/0026093 A1      Jan. 25, 2024

(30) Foreign Application Priority Data

Jul. 25, 2022    (IT) ........................ 102022000015600

(51) Int. Cl.
| | |
|---|---|
| *C08J 3/20* | (2006.01) |
| *C08J 3/00* | (2006.01) |
| *C08J 3/12* | (2006.01) |
| *C08J 11/06* | (2006.01) |

(52) U.S. Cl.
CPC .............. *C08J 3/203* (2013.01); *C08J 3/005* (2013.01); *C08J 3/12* (2013.01); *C08J 11/06* (2013.01); *C08J 2300/00* (2013.01)

(58) Field of Classification Search
None
See application file for complete search history.

(56) References Cited

U.S. PATENT DOCUMENTS

2022/0235551 A1* 7/2022 Vest ......................... B29B 9/12

FOREIGN PATENT DOCUMENTS

| | | |
|---|---|---|
| CN | 113799512 A | 12/2021 |
| DE | 4232187 A1 | 3/1994 |
| GB | 2270990 A | 3/1994 |
| JP | 2007261120 A | 10/2007 |
| KR | 20180115443 A | 10/2018 |

* cited by examiner

*Primary Examiner* — Robert T Butcher
(74) *Attorney, Agent, or Firm* — Carmel Patent Agency; Robert Ballarini

(57) ABSTRACT

A process for the treatment of a photopolymer material that constitutes matrix plates in flexographic printing includes:
  shredding and refining the matrix plates into pieces and subsequent cold grinding to obtain a powder;
  mixing the powder with a thermosetting resin and an amine hardener;
  carrying out a first phase of turbomixing;
  carrying out a first phase of cooling;
  carrying out a second phase of turbomixing;
  carrying out a second cooling phase;
  mixing the mixture in a cooling unit;
  adding an amine catalyst for thermosetting resins;
  inserting into a vacuum gauge;
  pouring the mixture into a mold;
  subjecting the mixture to two post-polymerization cycles in an oven.

8 Claims, No Drawings

PROCESS FOR THE TREATMENT OF THE PHOTOPOLYMER MATERIAL THAT CONSTITUTES THE MATRIX PLATES IN FLEXOGRAPHIC PRINTING

INVENTIVE FIELD

The present invention relates to a process for treating the photopolymer material which forms the matrix plates in flexographic printing.

BACKGROUND

It is known that the photopolymer material which constitutes the matrix plates used in flexographic printing is a material which wears out over time or becomes outdated in order to be replaced.

Flexography is a direct rotary printing method that uses relief matrix plates made of rubber or photopolymer material called clichés.

At the end of the printing process the master plates are discarded.

This elimination involves some drawbacks and in particular:

a disposal cost, a cost of loss of material.

SUMMARY

The object of the invention is to eliminate these drawbacks and to use the matrix plates to produce a new product which has the aim of identifying a possible field of application for their recycling, such as for example a filler for common polymeric matrices.

These aims are achieved according to the invention with a treatment process of the photopolymer material which constitutes the matrix plates in flexographic printing as described in the appended claims.

DETAILED DESCRIPTION OF THE PREFERRED EMBODIMENTS

The present invention is hereinafter further explained in a preferred embodiment thereof, given for purely exemplifying but non-limiting purposes with reference to the following description.

The process according to the invention provides for starting from a matrix plate of photopolymer material of different sizes, waste from the matrix plates used in flexographic printing, which is transformed into powder to be reused in the transformation processes of thermosetting polymers.

The photopolymer cliché in plate form is reduced into pieces smaller than 10 mm in each direction through a system of shredding and then refining machine.

For shredding the photopolymer cliché pieces into powder, the cold grinding method was used, using dry ice or nitrogen, to obtain a powder with a particle size of less than 500 microns.

The grinding into powder was performed at temperatures ranging from −35° C. to −140° C. with the cryomilling technique using nitrogen and a "cryomill" machine.

The ideal grain size is from 100 to 500 microns, preferably 100-250 microns. The grinding has not compromised the original characteristics of the material.

The process according to the invention then provides for mixing this powder with a thermosetting resin and an amine hardener for a time interval between 1 and 3 minutes, preferably 2 minutes, the weight ratio between thermosetting resin and amine hardener is 100:25

Subsequently, the composite thus obtained is placed inside a turbomixer equipped with an impeller.

turbomixer impeller speed is in the range of 9000 RPM-10,000 RPM, especially 9500 RPM. Since the mixing phase at this speed produces a strong heating of the turbomixer, this phase is divided into two cycles of 10-20 minutes, preferably 15 minutes, interspersed with a cooling phase in a refrigerating organ, which works at a temperature between −25° C. and −35° C.: preferably −30° C. lasting about 25-35 minutes, preferably 30 minutes.

This duration has proved to be sufficient for the purposes of cooling the system down to 10° C.-14° C., preferably 12° C.

At the end of the two subsequent cooling phases, the mixture was introduced again into the cooling unit for 4-6 minutes, preferably 5 minutes and subsequently subjected to mixing for 4-6 minutes, preferably 5 minutes at a speed of 1400 RPM-1600 RPM, preferably 1500 RPM, during which phase an amine catalyst for thermosetting resins was added.

Preferably the whole can be inserted into a vacuum gauge and kept there for about 8-12 minutes, preferably 10 minutes at a pressure of 45-55 mbar, preferably 50 mbar.

Subsequently, the mixture was poured onto a Teflon® (PTFE) mold consisting of a series of cavities suitable for the production of articles of the desired shape.

Once the mixture was poured, it was left to crosslink at a room temperature of about 22-26° C. for about 12-24 hours, preferably 18 hours and subsequently subjected to two post-polymerization cycles, the first of which lasting about one hour at a temperature of 80° C. and the second lasting 6 hours at a temperature of 105° C. inside a normal natural convection oven.

After extraction from the Teflon® mold, the various samples were subjected to smoothing with sandpaper or other smoothing means in order to uniform the thickness in all points.

From what has been said it is clear that the process according to the invention allows to obtain an additive which, mixed with a thermosetting resin, allows to obtain a composite which keeps the performance characteristics of the resin almost unchanged, allowing a saving of raw material, energy and therefore guaranteeing the product made with the resin a lower environmental impact.

What is claimed is:

1. A process for the treatment of a photopolymer material that constitutes matrix plates in flexographic printing, the method comprising:

shredding and refining of the matrix plates into pieces smaller than 10 mm in each direction and subsequent cold grinding to obtain a powder with a particle size between 100 and 500 microns;

mixing said powder with a thermosetting resin and an amine hardener for a time of 1-3 minutes; the weight ratio between thermosetting resin and amine hardener being 100:25;

carrying out a first phase of turbomixing with an impeller that rotates in the range of 9000 RPM-10,000 RPM;

carrying out a first phase of cooling in a freezer that operates between −25° C. and −35° C.;

carrying out a second phase of turbomixing with an impeller that rotates in the range of 9000 RPM-10,000 RPM;

carrying out a second cooling phase in a freezer that operates between −25° C. and −35° C., the second cooling phase lasting about 25-35 minutes;

mixing of the mixture in the freezer for a time of 4-6 minutes;

adding an amine catalyst for thermosetting resins to the mixture;

inserting the mixture into a vacuum for about 8-12 minutes, at a pressure of 45-55 mbar;

pouring the mixture into a mold allowing the mixture to crosslink at room temperature for about 12-24 hours;

subjecting the mixture to two post-polymerization cycles in an oven, the first lasting about an hour at a temperature of 80° C. and the second lasting 6 hours at a temperature of 105° C.

2. The process according to claim 1, wherein the photopolymer material is triturated into pieces of 5 mm.

3. The process according to claim 1, wherein by cold grinding a powder with a particle size of between 100-250 microns is obtained.

4. The process according to claim 1 wherein the powder is mixed with the thermosetting resin and the amine hardener for two minutes.

5. The process according to claim 1, wherein the turbo-mixing impeller rotates at 9500 RPM.

6. The process according to claim 1, wherein the two cooling phases have a duration of 10 minutes.

7. The process according to claim 1, wherein the freezer works at a temperature of −30° C. for a time of 30 minutes.

8. The process according to claim 1, wherein the mixture in the mold is cross-linked for eighteen hours.

* * * * *